April 13, 1965  S. MacDONALD ETAL  3,178,237
ROTARY FEEDER
Filed May 21, 1963  3 Sheets-Sheet 1
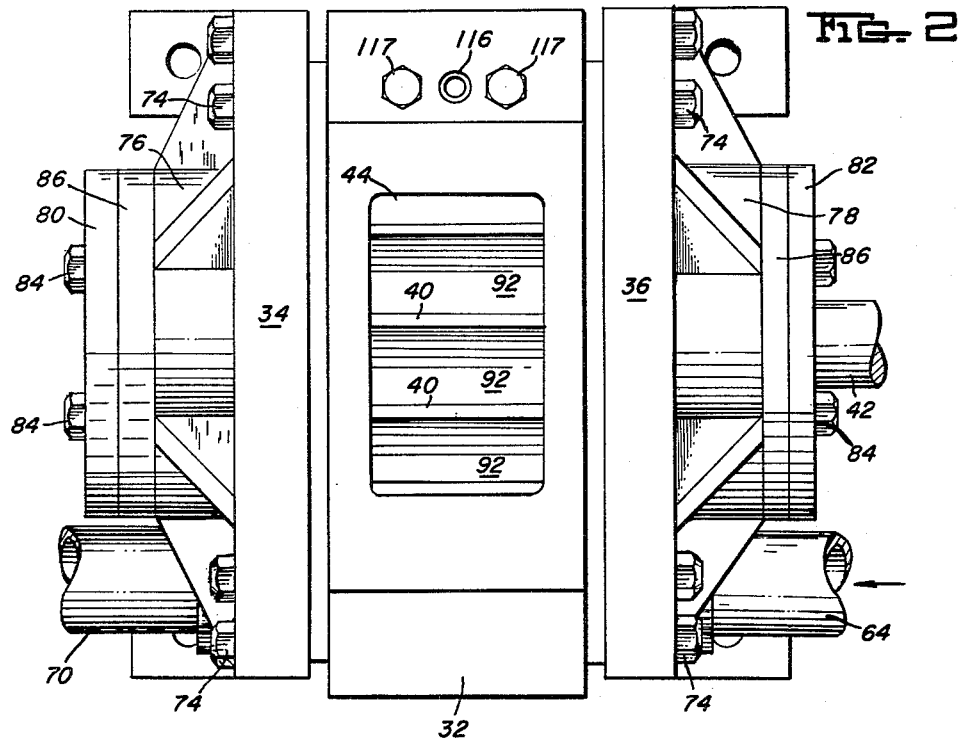
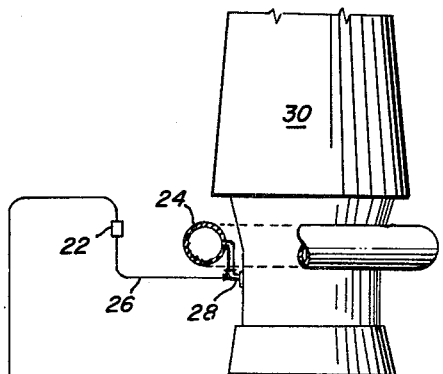
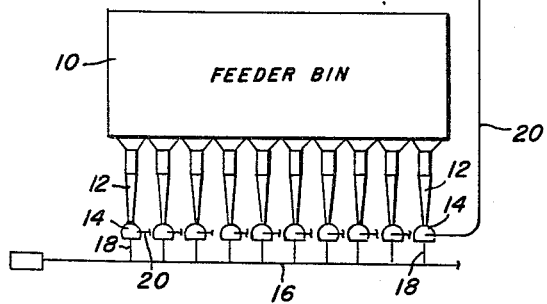
INVENTORS
SOMERLED MacDONALD,
ELWOOD V. SCHULTE
By
  Their Attorney April 13, 1965 S. MacDONALD ETAL 3,178,237
ROTARY FEEDER
Filed May 21, 1963 3 Sheets-Sheet 2
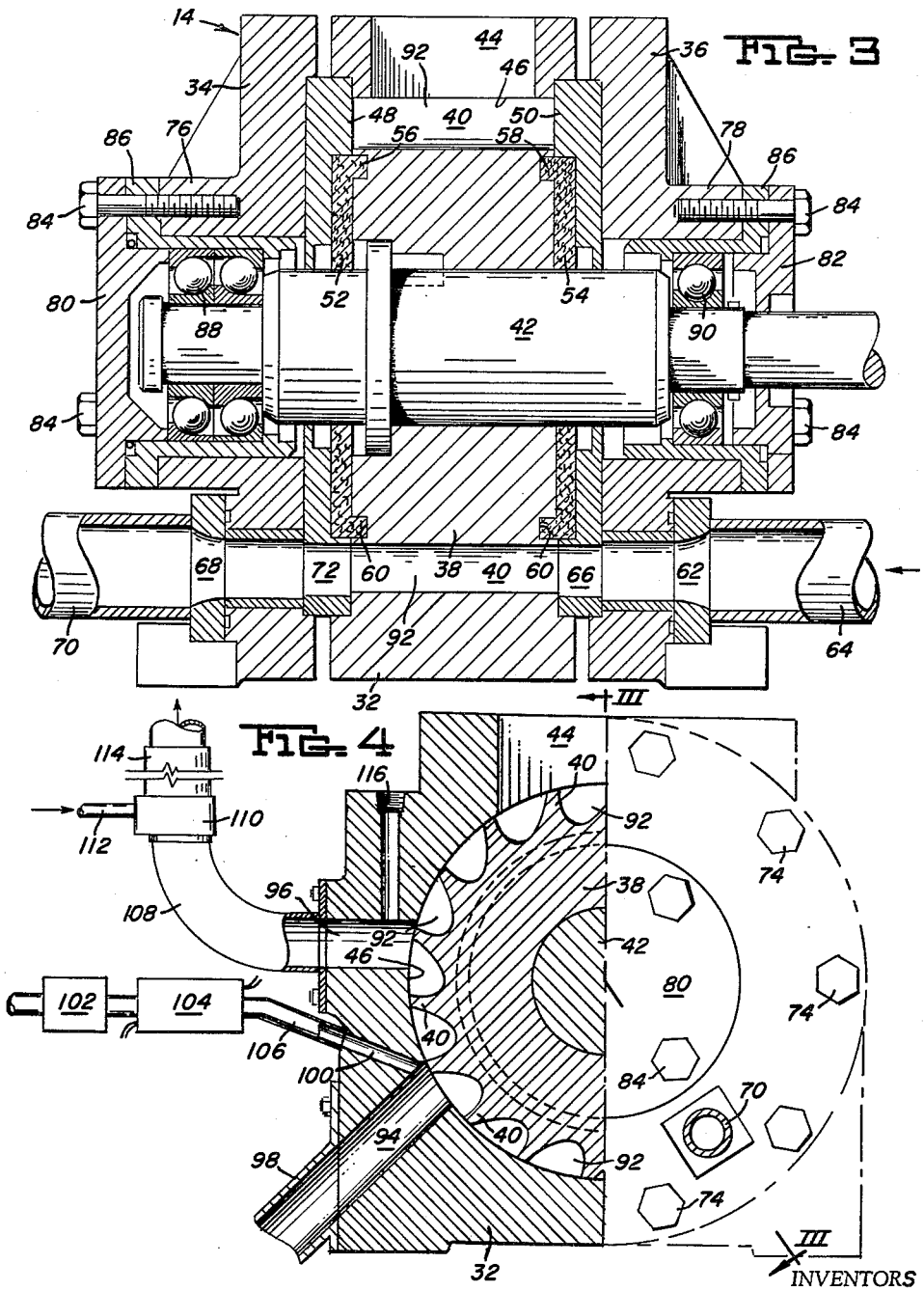
INVENTORS
SOMERLED MacDONALD,
ELWOOD V. SCHULTE
By Stanley J Price
their Attorney

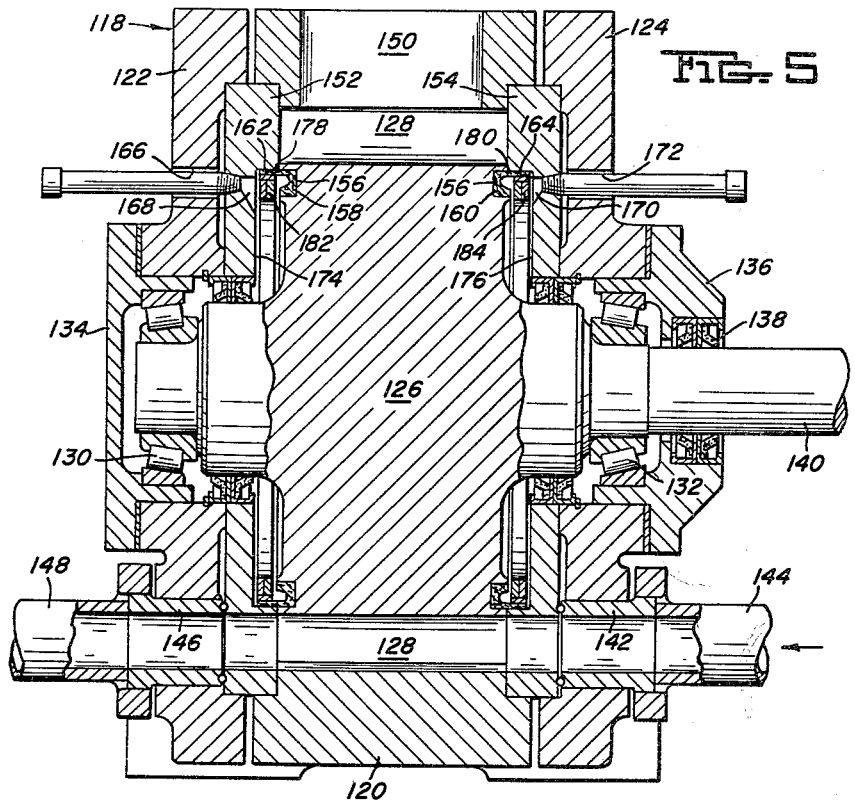
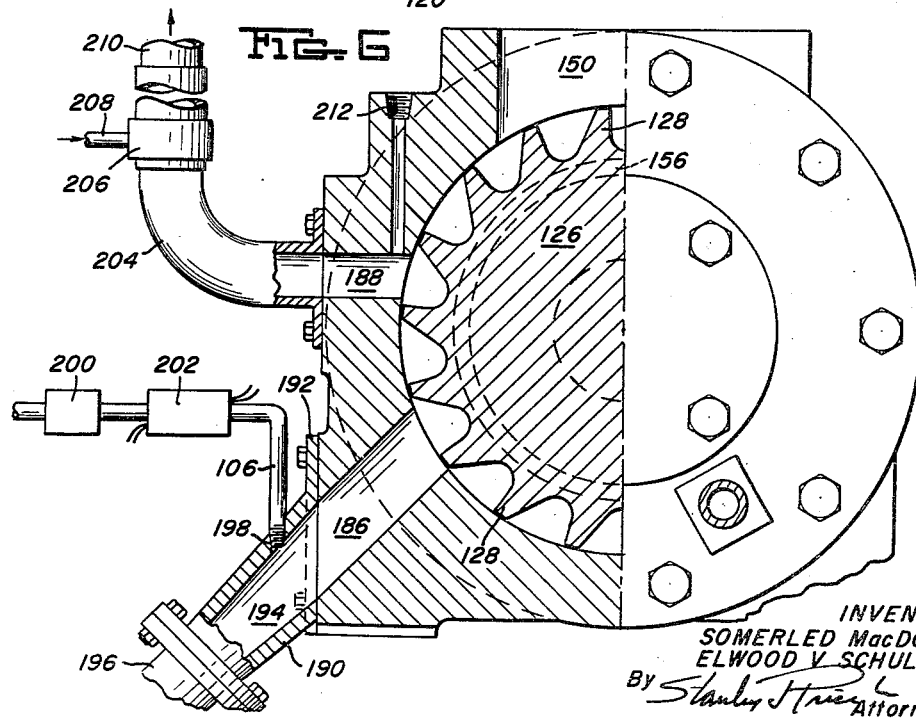

ХХХ

United States Patent Office 3,178,237
Patented Apr. 13, 1965

3,178,237
ROTARY FEEDER
Somerled Macdonald, Sewickley, and Elwood V. Schulte, Pittsburgh, Pa., assignors to Koppers Company, Inc., a corporation of Delaware
Filed May 21, 1963, Ser. No. 281,918
9 Claims. (Cl. 302—49)

This invention relates to a rotary feeder and more particularly to a new and improved rotary feeder for introducing particulate solids such as coal particles into a pressurized fluid carrier.

Rotary coal feeders have been used in the past to transfer particulate solids from a hopper maintained at atmospheric pressure to a pressurized air stream for delivery to a combustion unit. Patents No. 2,750,233 and No. 2,750,234 illustrate such prior art rotary feeders.

Rotary coal feeders of the prior art have used rotors with spaced peripheral material receiving pockets. Such pockets cooperate with the casing to define a conveying means. The pockets on the outer periphery are arranged to receive a supply of coal particles at a solids inlet, rotate through a preselected arc and discharge the coal particles at a discharge outlet. The discharge is effected by ejecting the coal particles with a pressurized fluid carrier, thereby leaving a pressurized pocket. The pressurized pocket is then rotated through a preselected arc for return to the solids inlet to receive another supply of coal particles. Difficulty is encountered in the reloading of the pockets because the pressurized air in the pockets impedes the flow of coal particles into the pockets. Although the pressurized pockets have been vented under experimental bench-scale conditions with limited success, it has been found that such venting is unsatisfactory under actual operating conditions. With high moisture coal, the coal quickly accumulates in the vent conduits and passageways and flow through the pump is reduced and eventually stops. Where the moisture content of the coal exceeds six percent, continued extended use of the known rotary feeders is not possible due to the plugging of the vent conduits and passageways. The transfer lines used to convey the coal particles from the vent passageways to a storage means also quickly clog after very short periods of time. It was found that increasing the size of the transfer lines did not prevent the plugging of the transfer lines.

It was discovered that where auxiliary air under pressure is supplied to the primary venting means and air is aspirated from a secondary venting means by an ejector, clogging is eliminated and the rotary feeder efficiency is increased. The improved feeder can convey coal particles having a moisture content above seven percent without difficulty. The ejector not only aspirated pressurized air from the pockets registering therewith but also created a vacuum in the pockets. When such pockets registered with the solids inlet the coal fed more freely into the pockets and blowback of pressurized air from the pockets was eliminated. A surprising result was the increased capacity of the rotary feeder because of such primary and secondary venting.

It was found, because of the high mass and specific heat of the coal relative to that of the air, the air temperature in the venting process tended to cool to approximately the temperature of the coal particles. During such venting process the air expands and is cooled considerably, thereby becoming saturated with moisture. Such saturated air in combination with the fine wet coal particles is conductive to plugging, particularly when changing directions as in transport back to the hopper. With the heating of the air supplied to the respective venting means, feeding became more efficient since the conditions conducive to clogging were eliminated. Capacity and efficiency were further increased by the arrangement and location of the venting means relative to the discharge means and the individual pockets as they registered with the auxiliary heated air supplied thereto.

The present invention comprises a rotor having a plurality of pockets around the periphery thereof. The pockets cooperate with the rotor housing to provide compartments for the conveying of coal particles from the solids inlet opening, connected to a supply source, to a discharge opening after rotation through a preselected arc. The rotor casing includes a pressurized fluid carrier inlet means aligned with the discharge opening for entraining the coal particles as such coal laden pockets rotate into alignment with the fluid inlet means. A primary vent is provided to release the air pressure from the pockets and to also provide a means for removing the coal particles remaining in the pockets. Auxiliary air is provided to convey the coal particles to a suitable storage means. In addition, a secondary vent is provided between the primary vent and the solids inlet opening. The secondary vent further depressurizes the pockets prior to the alignment of such pockets with the solids inlet opening and removes any of the coal particles remaining in the pockets. Heated air is supplied to the vents to minimize the effect of super cooling of the air by the coal particles.

With the improved rotary feeder herein described, it is now possible to continuously convey high moisture coal particles therethrough without plugging the rotary feeder vent system. The improved rotary feeder is more efficient and its transport capacity is increased.

In the accompanying drawings there is shown for purposes of illustration one form which the invention may assume in practice.

In the drawings:

FIGURE 1 is a schematic flow diagram of a typical coal injection system incorporating the novel coal feeder therein.

FIGURE 2 is a top plan view of a coal feeder constructed in accordance with the principles of this invention.

FIGURE 3 is a cross sectional elevational view of the coal feeder taken along the lines III—III of FIGURE 4.

FIGURE 4 is an end view of the coal feeder showing a portion thereof in cross section.

FIGURE 5 is a view similar to FIGURE 3 of another embodiment of the invention.

FIGURE 6 is a view similar to FIGURE 4 of the embodiment illustrated in FIGURE 5.

Referring to FIGURE 1 of the drawings, suitably sized particulate coal is delivered to a feeder bin 10 in a conventional manner. Beneath the feeder bin 10, a plurality of hoppers or standpipes 12 receive the coal therefrom, and supply the coal by gravity to respective rotary feeders 14. Suitable means may be provided to weigh the particulate coal to establish the feed rate of coal particles. Minor adjustments in coal feeder speed are necessary because of changes in coal density due to variations in moisture content and coal particle size. The amount of particulate coal delivered by the coal feeder 14 is directly proportional to the speed or the revolutions per minute of the coal feeder 14. Compressed air is supplied from a suitable source to a common header 16. Branch conduits 18 connect the common header 16 to the individual rotary feeders 14. The rotary feeders 14 admix the coal particles fed from the respective headers or standpipes 12 with the compressed air from the branch conduits 18 and transfer the fluidized mass of air and coal particles to transfer lines 20, as will be later explained in detail. The fluidized mass is transported through transfer lines 20 to splitters 22, diagrammatically shown near a blast furnace bustle pipe 24. From the splitters 22 the fluidized mass of coal particles are delivered via branch conduit 26 to tuyeres 28 of blast furnace 30, where the fluidized coal particles are introduced into the blast furnace tuyere zone. Suitable control means may be provided to vary the coal-air ratio, the coal output from the respective rotary feeders 14, and the velocity of the fluidized mass within the respective transfer lines 20 in accordance with changes in furnace pressure and conditions.

The improved rotary feeder 14 is illustrated in detail in FIGURES 2 through 4. Referring more particularly to FIGURES 3 and 4, the improved coal feeder 14 has a rotor housing or casing 32 with end sections 34 and 36. The end section 36 has an air inlet opening and end section 34 has a discharge opening for the fluidized mass. A rotor 38 is positioned in the casing 32 and has peripheral teeth 40. A shaft 42 is suitably keyed to rotor 38 for rotation therewith. The casing 32 has a solids feed opening 44 spaced from the air inlet opening.

The rotor housing 32 is generally rectangular in shape and has a cylindrical bore 46 extending longitudinally therethrough. Set between the rotor housing 32 and each of the end sections 34–36 are wear plates 48 and 50 and seal discs 52 and 54. The rotor 38 and the seals 52 and 54 rotate together with an extremely small clearance space between the wear plates 48 and 50 and seals 52 and 54. In this manner leakage of high pressure air through the rotor is minimized. Each of the seal discs 52 and 54 is disc shaped with a circular aperture in the center thereof for the shaft 42. Along the outer rim of each of the seals 52 and 54 is a flange 56 and 58 upon which is fitted seal rings for positioning in circular recesses 60 formed in rotor 38 (FIGURE 3).

End section 36 (FIGURE 3) has an inlet opening 62 which is suitably connected to an air intake conduit 64 on one end thereof and to an opening 66 in the wear plate 50. End section 34 has a discharge opening 68 substantially in alignment with the inlet opening 62 in end section 36. A discharge conduit 70 is connected to outlet opening 68 and is arranged to convey the coal-air mixture from the feeder 14. The opening 68 also communicates with an opening 72 in wear plate 48. As noted in FIGURE 4, discharge conduit 70 is disposed at an angle of about 145° from the vertical. The rotor 38 as it rotates in a clockwise direction from the solids feed inlet 44 to the outlet conduit subtends an arc that is less than a straight angle or 180° as viewed in FIGURE 4. End sections 34 and 36 are secured to the rotor housing 32 by means of a plurality of bolts 74 (FIGURE 2) to provide for disassembly and maintenance. The respective end sections 34 and 36 have flange portions 76 and 78 respectively that are provided with suitably tapped holes for securely fastening respective end plates 80 and 82 thereto by the use of machine screws 84. Suitably located between the respective flanges 76 and 78 and their respective adjacent end plates 80 and 82 are thrust sleeves 86.

The shaft 42 is supported at one end by a bearing unit 88 and at the other end by a single bearing unit 90 and is keyed to the rotor 38 for rotation therewith. Rotor 38 is mounted for rotation in the bore 46 of rotor housing 32. The plurality of peripheral spaced teeth 40 on rotor 38 cooperate with the rotor housing 32 to define closed compartments or pockets 92 which register serially with the feed hopper 44 during rotation of rotor 38. As each pocket registers with the feed opening 44 it receives a supply of particulate coal for transport, during rotation of the rotor 38, to the discharge opening 68. Upon alignment of the coal particle filled pocket 92 with openings 62 and 68 the filled pocket 92 is conditioned for discharge into discharge conduit 70. The compressed air flowing through conduit 64 ejects the coal particles from pocket 92 and pressurizes the pocket 92 in a manner to be described.

The rotor housing 32 is provided with a pair of spaced vent openings 94 and 96 located between discharge conduit 70 and solids inlet opening 44. The one vent opening 94, hereinafter referred to as the primary vent opening, extends upwardly at an acute angle with reference to a vertical plane passing through the longitudinal center line of shaft 42 and the center line of solids inlet opening 44. As noted in FIGURE 4, the opening 94 is angularly spaced approximately 90° from the discharge conduit 70. A conduit 98 suitably conveys the discharge products from opening 94 to the feeder bin 10 to thereby recover the coal particles suspended in the vented air. Rotor housing 32 has a passageway 100 extending therein, communicating with the upper end portion of opening 94, which upper portion communicates with the bore 46. A fan or blower 102 is suitably connected to a heat exchanger 104 to supply a regulated quantity of heated air or other fluid medium at super atmospheric pressure through a conduit 106 to passageway 100. Passageway 100 is so orientated with opening 94 that as each pocket registers with opening 94 a blast of hot air from passageway 100 cleans the pockets 92 and discharges the coal particles and heated air through opening 94 into conduit 98.

The other vent opening 96, hereinafter referred to as the secondary vent opening 96, extends horizontally into bore 46, as viewed in FIGURE 4. Secondary vent opening 96 is connected by a conduit 108 to an ejector 110. Ejector 110 has a pumping fluid intake line 112 and a discharge conduit 114 suitably connected thereto. As is well known, the pumping fluid entering the intake line 112 passes through a venturi nozzle, where it develops a suction and entrains some of the fluid and coal particles from the suction chamber of the ejector 110 and from conduit 108 for discharge through discharge conduit 114. If desired, conduit 114 may have preheated air supplied thereto through conduit 112 to supply the ejector 110 with heated air. A plurality of passageways 116 in rotor housing 32 communicate with secondary opening 96 to provide a source of air at atmospheric pressure to facilitate the venting of the pockets as they register with opening 96. The passageways 116 are sized and tapped for pipe plugs 117 illustrated in FIGURE 2. The plugs 117 are provided for adjustment in the suction or carrying air rate through openings 96. The conduit 114 may be arranged to convey the coal particles entrained in the gas to the feeder bin 10.

In operation, coal particles are delivered to the feeder bin 10 from a suitable source. The coal particles are then fed by gravity into the pockets 92 as they register with solids inlet opening 44. As the rotor 38 rotates, the coal filled pockets 92 register with aligned openings 62 and 68. Air inlet opening 62 is connected to the air inlet conduit 64, and opening 68 is connected to discharge conduit 70. As the pockets 92 communicate with the aligned openings 62 and 68, pressurized air from air inlet conduit 64 ejects the coal particles from the pocket 92 into discharge conduit 70 for entrainment therewith. The fluidized mass of coal particles is conveyed through transport lines 20 to the coal splitters 22 and thence through conduits 26 to the tuyeres 28 and to the blast furnace 30.

As the compressed air empties the respective pockets 92 of coal particles in alignment with discharge conduit 70, such pockets are pressurized to the same pressure as the compressed air entering from air inlet conduit 64. Such pressurized pockets 92 register serially, upon rotation of rotor 38, with the primary vent opening 94. Heated air under pressure introduced through passageway 100 strikes the walls of pressurized pockets 92 and cleans the respective pockets of coal. The downwardly extending vent opening 94 receives the coal particles and heated air and conveys the particles away from the rotary feeder 14 through conduit 98. The use of heated forced air in the venting process and the position of the primary vent 94 minimizes the high moisture problems previously encountered. Upon continued rotation of the feeder wheel 38 the vented pockets 92 thereafter register with the secondary vent opening 96. Operation of the ejector 110 creates a vacuum within conduit 108, which in turn creates a suction in the pockets 92 registering therewith. Air enters secondary vent opening 96 through passageways 116 to provide air circulation through secondary vent opening 96. The suction created by the ejector 110 assures the removal of all remaining coal particles from the coal pockets and the vent openings. The herein disclosed venting process increases the capacity of the pockets 92 to receive coal particles upon registration of such depressurized pockets with the solids inlet opening 44 since the pockets are no longer pressurized and there is no blowback into the feed standpipe 12. In addition, the venting arrangement makes it possible to feed coal having a high surface moisture content.

In FIGURES 5 and 6 there is illustrated another embodiment of this invention. The rotary feeder in this embodiment is similar in many respects to the embodiment illustrated in FIGURES 1–4 and is generally designated by the numeral 118. The rotary feeder 118 has a generally cylindrical rotor housing or casing 120 with end sections 122 and 124 enclosing the open end portions of housing 120. Positioned within the housing 120 is a rotor wheel 126 which has a plurality of peripheral teeth 128. The rotor wheel 126 is supported in the end plates 122 and 124 by means of tapered roller bearings 130 and 132. Closure members 134 and 136 suitably support the tapered roller bearings and the axial shaft of rotor 126. Suitable dust seals 138 are provided in closure member 136 to prevent dust particles from contaminating tapered roller bearings 132.

The rotor 126 has a drive shaft 140 similar to that illustrated in the embodiment of FIGURES 1–4. The end plate 124 has an air inlet opening 142 to which an air inlet conduit 144 is connected. Similarly, the end section 122 has an outlet opening 146 to which an outlet conduit 148 is connected. The rotor housing 120 has a solids inlet opening 150 through which particulate material such as coal or the like is fed to the pockets formed by teeth 128. As the rotor wheel 126 rotates, air fed through conduit 144 ejects the particulate material from the respective pockets aligned therewith and transports the same through opening 146 to conduit 148.

The sides of the rotor 126 are enclosed by wear plates 152 and 154 which are located between the respective end plates 122 and 124 and the rotor housing 120. The rotor 126 has annular grooves 156 on each side thereof and each of the grooves is adapted to have a seal ring 158 and 160 positioned therein. The wear plates 152 and 154 are substantially disc shaped with annular shoulders 162 and 164 thereon. The annular shoulders 162 and 164 contact the rotor 126 leaving a space between the rotor side walls and the wear plates 152 and 154. Each wear plate 152 and 154 and each end section 122 and 124 has an aperture 166, 168, 170 and 172 therein for the insertion of oil into spaces 174 and 176 between the rotor 126 and the respective wear plates 152 and 154. The seal rings 158 and 160 are secured in the grooves of the rotor 126 and prevent leakage of high pressure air through the rotary feeder 118. The seal rings 158 and 160 are preferably formed of ring shaped members and positioned in the respective groove 156. The seal rings 158 and 160 have annular flanges 178 and 180 which abut the wear plate shoulders 162 and 164 to form a seal between the rotor 126 and wear plates 152 and 154. The disclosed seal ring effectively seals the pump whereby high pressure air in the pockets formed by teeth 128 in rotor wheel 126 does not leak through the rotary feeder 118 to the atmosphere and entrance of solid material into the spaces between the faces of rotor 126 and wear plates 152 and 154 is prevented. The seal rings 158 and 160 are maintained in operative position by means of expandible rings 182 and 184. The rings 182 and 184 urge the respective flanges 178 and 180 against the wear plate annular shoulders 162 and 164.

The rotor housing 120 is provided with a pair of spaced vent openings 186 and 188 located between discharge conduit 148 and solids inlet opening 150. The primary vent 186 extends upwardly at an acute angle with reference to a vertical plane passing through the longitudinal center line of shaft 140. A connector 190 has a flanged end portion 192 that is secured to the rotor housing 120 to align a passageway 194 with opening 186. The connector 190 is arranged to convey solid particles from the opening 186 to a conduit 196 connected thereto. The conduit 196 is arranged to convey the coal particles suspended in the air to the feeder bin 10 illustrated in FIGURE 1. The connector 190 has an opening 198 in its side wall to which is connected a conduit 106. The opening 198 is so oriented that air flowing through conduit 106 will assist in conveying the solid particles through passageway 94 to conduit 196. A fan 200 is suitably connected to a heat exchanger 202 and is arranged to supply a preselected quantity of heated air through conduit 106 to passageway 194.

With the arrangement illustrated in FIGURE 6 the air supplied to connector 190 can be heated to a relatively high temperature to dry the solid particles discharged through vent passageway 186 and conveyed through conduit 196. Where the feeder casing 120 is subjected to air at a substantially elevated temperature, unequal expansion of the rotor casing 120 would occur and bind the rotor 126 in the casing 120. With the arrangement disclosed in FIGURE 6 however, the heated air is directed away from the casing 120 so that heat is not transferred directly to the rotor casing 120 and air at higher temperatures can be utilized.

The other vent opening 188, the secondary vent, extends horizontally into the rotor housing and is connected by conduit 204 to an ejector 206 in a manner similar to that illustrated in FIGURES 1–4. The ejector 206 has a pumping fluid intake line 208 and a discharge conduit 210 suitably connected thereto. The fluid entering through conduit 208 passes through the venturi nozzle within ejector 206 where it develops a suction and entrains the fluid and coal particles from the conduit 204 and passageway 188. A plurality of passageways 212 are provided in rotor housing 120 and communicate with second opening 188 to provide a source of air at atmospheric pressure to facilitate the venting of the pockets formed by rotor teeth 128 as they register with opening 188. The passageways 212 are sized and tapped for pipe plugs similar to that illustrated in FIGURE 2. The plugs are provided for adjustment in the suction or carrying air rate through openings 96.

With the arrangement illustrated in FIGURES 5 and 6, the air supplied through conduit 106 assists in conveying the particles in passageway 194 through conduit 196 to the feeder bin 10.

It should be understood, of course, that the foregoing disclosure relates to the preferred embodiments of the invention and that numerous modifications or alterations may be made therein without departing from the spirit or the scope of the invention as set forth in the appended claims.

To illustrate the improved operability of the herein disclosed rotary feeder, extended continuous runs were made using the improved rotary feeder to transport particulate coal. The air supplied to the primary vent 94 through passageway 100 and to the ejector 110 was heated to a temperature of between about 250 and 290° F. It was found that approximately 10 standard cubic feet of air to the primary vent 94 through passageway 100 and 15 standard cubic feet of air to ejector 110 was satisfactory for continuous operation. The herein disclosed improved rotary feeder was run continuously for over 600 hours at a throughput of 5200 lbs. of coal per hour. After this extended continuous operation the vent systems were dismantled and no coal particles were found in the vent piping. During the extended continuous operation of the improved rotary feeder, the coal particles had a moisture content often as high as 8.4 percent and in one instance a value of 8.9 percent was recorded. The pressure at the primary vent ranged from 8.0 to 30 inches water gauge and the suction at the secondary vent ranged from 1.5 to 6.0 inches of water. It is believed the variations in these pressures were caused by variations in coal moisture and coal size.

The capacity of the improved rotary feeder was compared with the rotary feeders of the prior art. At 20 r.p.m. throughput of the improved rotary feeder was approximately 8.35 lbs. per minute greater than the rotary feeders of the prior art. At 30 r.p.m. an increased throughput of 10.8 lbs. per minute was recorded.

It is now possible to have a rotary feeder that will operate continuously with high moisture coal and the previously experienced problem of vent line plugging has been eliminated. The improvement in the rotary feeder includes supplying heated pressurized air in a preselected direction to the primary vent to remove the coal particles from the rotor pockets. The rotary feeder is further improved by providing a vacuum for the secondary vent passageway and opening a portion of the vent passageway to the atmosphere to provide carrying air to remove any coal particles that build up in the secondary vent passageway.

According to the provisions of the patent statutes, the principle, preferred construction, and mode of operation of the invention have been explained, and what is now considered to represent its best embodiments have been illustrated and described. However, it should be understood that, within the scope of the appended claims, the invention may be practiced otherwise than as specifically illustrated and described.

We claim:

1. A rotary solids feeder device comprising
   a casing having a hollow chamber therein,
   a rotor mounted in said chamber for rotation,
   said rotor having a plurality of circumferentially spaced pockets wherein each pocket is cooperative with said casing to define a closed container for the transmitting of solid particles,
   a first inlet means connected to said casing for supplying solid particles to said chamber and to said pockets as said rotor rotates in said chamber,
   a second inlet means connected to said casing for supplying a pressurized medium to said chamber and to said pockets as said rotor rotates in said chamber,
   a discharge means connected to said casing in alignment with said second inlet means for communication with said second inlet means upon registration of said pockets with said discharge means and said second inlet means,
   vent means in said casing between said discharge means and said first inlet means for serially communicating with said pockets as said rotor rotates in said chamber to vent and exhaust said pressurized medium in said pockets,
   a conduit connected to said vent means to convey solid particles entrained in said pressurized medium from said vent means, and
   means for supplying fluid at superatmospheric pressure to said conduit to convey said solid particles through said conduit.

2. A rotary solids feeder as set forth in claim 1 which includes a passageway in said casing communicating with said vent means,
   said passageway arranged to supply fluid at superatmospheric pressure to said vent means and said rotor pockets so that said fluid entrains substantially all of said solid particles remaining in said pockets and said vent means.

3. A rotary solids feeder as set forth in claim 1 which includes a second conduit communicating with said first conduit,
   said second conduit arranged to supply fluid at superatmospheric pressure to said first conduit to convey said solid particles through said conduit.

4. A rotary solids feeder as set forth in claim 1 wherein said casing has a second vent means extending into said chamber and located between said first vent means and said first inlet means,
   said second vent means serially communicating with said pockets as said rotor rotates in said chamber, and
   means operatively connected to said second vent means for creating a suction in said second vent means and said pockets registering therewith.

5. A rotary solids feeder as set forth in claim 1 wherein said casing has a second vent means extending into said chamber and located between said first vent means and said first inlet means,
   said second vent means serially communicating with said pockets as said rotor rotates in said chamber,
   means connecting said second vent means to a suction means for creating a suction in said second vent means and pockets registering therewith, and
   said casing having an opening communicating with said second vent means for flow of carrier air therethrough,
   means to vary the size of said opening to control the amount of carrier air supplied to said second vent means, and
   said carrier air operable to entrain and remove solid particles in said second vent means and convey said solid particles away from said second vent means.

6. A rotary coal feeder comprising
   a casing having a chamber therein,
   a rotor mounted in said chamber for rotation about a horizontally disposed axis,
   said rotor having a plurality of circumferentially spaced transfer means,
   a solids inlet opening communicating with said chamber to supply particulate coal thereto, said solids inlet opening being generally normal to said rotor axis,
   an air inlet opening and a discharge opening located on opposed portions of said casing, said air inlet opening aligned with said discharge opening,
   said transfer means on said rotor describing an angle less than a straight angle upon rotation from said solids inlet opening to said air inlet opening,
   spaced primary and secondary vent means in said casing communicating serially with said transfer means on rotation of said rotor, said primary vent means extending downwardly and outwardly from said chamber and positioned between said air inlet opening and said solids inlet opening,
   means connected to said primary vent means for supplying heated air at superatmospheric pressure to said primary vent means, and
   said secondary vent means operatively connected to ejector means for creating a suction in said transfer means registering therewith.

7. A rotary coal feeder comprising
   a casing having a chamber therein,
   a rotor mounted in said chamber for rotation about a horizontally disposed axis,
   said rotor having a plurality of circumferentially spaced transfer pockets,
   a particulate coal inlet opening communicating with said chamber and arranged to supply particulate coal thereto, said particulate coal inlet opening being generally normal to said rotor axis,
   an air inlet opening and a discharge opening located on opposed portions of said casing, said air inlet opening aligned with said discharge opening, said aligned air inlet opening and said discharge opening arranged parallel to said rotor axis,
   said transfer pockets describing an angle less than a straight angle upon rotation from said particulate coal inlet opening to said discharge opening, a primary vent passageway in said casing communicating with said chamber and an outer surface of said casing, said primary vent passageway being inclined to permit coal particles to flow downwardly therethrough from said rotor pockets, a vent air passageway communicating with said primary vent passageway and said chamber, said vent air passageway so positioned to direct air under pressure into said rotor pockets and entrain the coal particles contained therein, said primary vent passageway arranged to receive the pressurized air and entrained coal particles from said rotor pockets, means to supply air at an elevated temperature and superatmospheric pressure to said vent air passageway, said primary vent passageway positioned in said casing between said air inlet and said particulate coal inlet opening, a secondary vent passageway in said casing communicating with said chamber and the outer surface of said casing, said second vent passageway positioned in said casing between said primary vent passageway and said particulate coal inlet opening, means connecting said secondary vent passageway with a vacuum means to provide a suction in said secondary vent passageway, and a carrier air opening in said casing communicating with said secondary vent passageway, said carrier air opening arranged to supply carrier air to said secondary vent passageway to entrain coal particles in said secondary vent passageway.

8. A rotary coal feeder comprising a casing having a chamber therein, a rotor mounted in said chamber for rotation about a horizontally disposed axis, said rotor having a plurality of circumferentially spaced transfer pockets, a particulate coal inlet opening communicating with said chamber and arranged to supply particulate coal thereto, said particulate coal inlet opening being generally normal to said rotor axis, an air inlet opening and a discharge opening located on opposed portions of said casing, said air inlet opening aligned with said discharge opening, said aligned air inlet opening and said discharge opening arranged parallel to said rotor axis, said transfer pockets describing an angle less than a straight angle upon rotation from said particulate coal inlet opening to said discharge opening, a primary vent passageway in said casing communicating with said chamber and an outer surface of said casing, said primary vent passageway being inclined to permit coal particles to flow downwardly therethrough from said rotor pockets, a connector secured to said rotor casing and having a passageway communicating with said primary vent passageway, a vent air conduit communicating with said connector passageway and operable to supply vent air to said connector passageway, said vent air conduit so positioned to direct air into said connector passageway and entrain coal particles contained therein, means to supply air at an elevated temperature and superatmospheric pressure to said vent air conduit, said primary vent passageway positioned in said casing between said air inlet and said particulate coal inlet opening, a secondary vent passageway in said casing communicating with said chamber and the outer surface of said casing, said second vent passageway positioned in said casing between said primary vent passageway and said particulate coal inlet opening, means connecting said secondary vent passageway with a vacuum means to provide a suction in said secondary vent passageway, and a carrier air opening in said casing communicating with said secondary vent passageway, said carrier air opening arranged to supply carrier air to said secondary vent passageway to entrain coal particles in said secondary vent passageway.

9. A rotary coal feeder comprising a casing having a chamber therein, a rotor mounted in said chamber for rotation about a horizontally disposed axis, said rotor having a plurality of circumferentially spaced transfer pockets, a particulate coal inlet opening communicating with said chamber and arranged to supply particulate coal thereto, said particulate coal inlet opening being generally normal to said rotor axis, an air inlet opening and a discharge opening located on opposed portions of said casing, said air inlet opening aligned with said discharge opening, said aligned air inlet opening and said discharge opening arranged parallel to said rotor axis, said transfer pockets describing an angle less than a straight angle upon rotation from said particulate coal inlet opening to said discharge opening, a primary vent passageway in said casing communicating with said chamber and an outer surface of said casing, said primary vent passageway being inclined to permit coal particles to flow downwardly therethrough from said rotor pockets, a vent air passageway communicating with said primary vent passageway and said chamber, said vent air passageway so positioned to direct air under pressure into said rotor pockets and entrain the coal particles contained therein, said primary vent passageway arranged to receive the pressurized air and entrained coal particles from said rotor pockets, means to supply air at an elevated temperature and superatmospheric pressure to said vent air passageway, said primary vent passageway positioned in said casing between said air inlet and said particulate coal inlet opening, a secondary vent passageway in said casing communicating with said chamber and the outer surface of said casing, said second vent passageway positioned in said casing between said primary vent passageway and said particulate coal inlet opening, an air ejector operably connected to said secondary vent passageway to provide a suction in said secondary vent passageway, means to supply air at an elevated temperature and at superatmospheric pressure to said air ejector, and a carrier air opening in said casing communicating with said secondary vent passageway, said carrier air opening arranged to supply carrier air to said secondary vent passageway to entrain coal particles in said secondary vent passageway.

References Cited by the Examiner

UNITED STATES PATENTS

| | | | |
|---|---|---|---|
| 941,024 | 11/09 | Mantius | 302—49 |
| 1,609,401 | 12/26 | Crites | 302—49 |
| 2,489,925 | 11/49 | Omwake | 302—49 |
| 2,750,233 | 6/56 | Yellott | 302—49 |
| 2,858,212 | 10/58 | Durant | 302—49 |
| 2,907,499 | 10/59 | Agronin | 302—49 |

SAMUEL F. COLEMAN, *Primary Examiner.*

ANDRES H. NIELSEN, *Examiner.*